(12) United States Patent
Portman et al.

(10) Patent No.: US 6,496,939 B2
(45) Date of Patent: *Dec. 17, 2002

(54) METHOD AND SYSTEM FOR CONTROLLING DATA IN A COMPUTER SYSTEM IN THE EVENT OF A POWER FAILURE

(75) Inventors: Roland F. Portman, Pleasanton, CA (US); Ricardo H. Bruce, Union City, CA (US)

(73) Assignee: Bit Microsystems, Inc., Fremont, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/399,908

(22) Filed: Sep. 21, 1999

(65) Prior Publication Data

US 2002/0049917 A1 Apr. 25, 2002

(51) Int. Cl.$^7$ .............................. G06F 1/26; G06F 1/28; G06F 1/30
(52) U.S. Cl. ......................................... 713/340; 713/330
(58) Field of Search ................................ 713/300–340; 714/2, 14, 22

(56) References Cited

U.S. PATENT DOCUMENTS

| 4,449,205 A | * | 5/1984 | Hoffman | 365/185.08 |
|---|---|---|---|---|
| 4,807,141 A | * | 2/1989 | Muller | |
| 4,965,828 A | * | 10/1990 | Ergott, Jr. et al. | 380/50 |
| 4,999,575 A | * | 3/1991 | Germer | 324/142 |
| 5,542,042 A | | 7/1996 | Manson | |
| 5,768,208 A | * | 6/1998 | Bruwer et al. | 365/228 |
| 5,799,200 A | | 8/1998 | Brant et al. | |

FOREIGN PATENT DOCUMENTS

| EP | 0458510 | 11/1991 |
|---|---|---|
| EP | 0964360 | 12/1999 |

* cited by examiner

Primary Examiner—Rupal Dharia
(74) Attorney, Agent, or Firm—Sawyer Law Group LLP

(57) ABSTRACT

A method and system for controlling data in a computer system when the computer system loses power is disclosed. The method and system comprises activating a plurality of super capacitors to supply power to the computing engine based upon power being removed from the computer system and reconfiguring the data in the computing engine. Through the use of a system and method, large amounts of newly written and modified data can be stored from the volatile memory to the non-volatile memory in the event of a sudden external system power loss. The system and method allows data to be rapidly and irretrievably erased from the non-volatile memory automatically, in the event of a sudden loss of external power, or manually. This capability consumes minimal space and weight and is implemented in an affordable manner.

28 Claims, 5 Drawing Sheets

METHOD AND SYSTEM FOR CONTROLLING DATA IN A COMPUTER SYSTEM IN THE EVENT OF A POWER FAILURE

FIELD OF INVENTION

The present invention relates generally to computer systems and more particularly to a system and method for controlling data in such a system when the system loses external power.

BACKGROUND OF THE INVENTION

Most modern computer systems utilize various types of memory for handling data. A typical computer system consists of a central processing unit (CPU), cache memory, main memory, and long-term data storage such as a hard disk drive (HDD). Cache memory is significantly faster than main memory but has much less data capacity and more costly. Similarly main memory is significantly faster than a HDD, but also stores significantly less data and is more costly. Cache memory is very high speed memory designed to hold upcoming to-be-accessed and/or recently-accessed data. Data retrieved from the relatively slow HDD may be still be resident in the cache or in the main memory, thus the CPU can re-access that data from the cache many times faster than from main memory and hundreds of times faster than from the HDD. However, cache memory and main memory are characterized as volatile memory. Volatile memory (VM) is memory that contains data that is subject to erasure when the external power supply is shut down. A HDD is characterized as a non-volatile storage.

Consequently, the first problem that is encountered in this environment is that when there is an sudden loss of external power there is insufficient time to safely write all the newly written and modified data from the VM to the HDD before the computer system shuts down. This poses a significant risk on the customer's data contained in the VM. Perhaps a very small amount of data could be safely saved to the HDD during the limited time available from detection to shutdown. However this would place a severe restriction on the amount of newly written and modified data that could be held in the VM which would basically eliminate the performance gains achieved by using the VM.

A battery could be coupled to the internal power system, however the use of batteries pose significant problems. Batteries have a limited number of charge-drain cycles, have a large internal resistance, and are physically very large and heavy. Additionally a HDD consumes significant amounts of power. The size and capacity of the batteries needed to supply power to the CPU, VM and HDD make them impractical. Alternatively a battery-backed uninterruptible power supply (UPS) could be connected in series with the external power source to provide power to the entire computer system in the event of a loss of external power. However, an UPS is physically large, heavy and relatively expensive.

Another significant problem associated with conventional computer technology is the ability to erase data from a HDD. Erasing all data from a disk, rapidly, and without the possibility of retrieval, is a mandatory requirement as an action of last resort for many applications. For example, if the data being stored is particularly valuable or otherwise sensitive and imminent access by hostile parties cannot be avoided, then the data must be destroyed instantaneously and irretrievably.

Normally when data is erased from a HDD, only the information to track the location of the files on the physical disk media is removed. This means that it is possible to retrieve the data by reconstructing the File Allocation Table (FAT). Some HDD erase utilities overwrite the actual data so that it cannot be easily recovered. However, due to the remnants of magnetic particle polarization, it is possible to recover data from a HDD even though the data has been deliberately overwritten. In order to prevent such data recovery, each storage element needs to be overwritten with specific data patterns repeatedly five or six times. To do this for every bit on a high capacity HDD take a very long time.

Accordingly, what is needed is a method for providing power to the computer system in the event of a sudden loss of power such that all newly written and modified data in the VM will be correctly stored in the non-volatile storage. What is further needed is method for rapidly erasing all data from a large non-volatile storage without the possibility of Do retrieval even in the event of a sudden loss of power. The method should be affordable and consume minimal space and weight. The present invention addresses such a need.

SUMMARY OF THE INVENTION

The present invention discloses a method and system for controlling data in a computer system when the computer system loses power, the computer system comprising a computing engine. The method and system comprises activating a plurality of super capacitors to supply power to the computing engine based upon power being removed from the computer system and reconfiguring the data in the computing engine.

Through the use of a system and method in accordance with the present invention, a user is able to correctly store large amounts of newly written and modified data from the volatile memory to the non-volatile memory in the event of a sudden external system power loss. Furthermore, the user of a system and method in accordance with the present invention will be able to rapidly and irretrievably erase data from the non-volatile memory automatically, in the event of a sudden loss of external power or manually. This capability consumes minimal space and weight and is implemented in an affordable manner.

DETAILED DESCRIPTION OF THE INVENTION

The present invention provides a method and system for controlling data in a computer system. The following description is presented to enable one of ordinary skill in the art to make and use the invention and is provided in the context of a patent application and it requirements. Various modifications to the preferred embodiment will be readily apparent to those skilled in the art and the generic principles herein may be applied to other embodiments shown but it is to be accorded the widest scope consistent with the principles and features described herein.

The method and system in accordance with the present invention contemplates the use of super-capacitors as a short term power source. With the advent of low cost super-capacitors available in values to over 10 Farads, large amounts of energy can be affordably stored internally in a very small space to use as a short term power source to extend operations well beyond a detected loss of external system power. The extended length of time can range from a few hundred milliseconds to tens of seconds depending on the value, quantity and configuration of the super-capacitors.

To further understand the method and system in accordance with the present invention please refer to the formula I=C dv/dt (Current in amperes is equal to the No Capacitance in Farads times the change in voltage in Volts divided by the change in time in seconds), or dt=C dv/I . In order to increase the time, one can reduce the current, increase the amount of capacitance, or increase the change in voltage across the super-capacitor. The amount of capacitance is limited by the physical space of the enclosure and the current draw is fixed based on the operations that are taking place when the system in accordance with the present invention is activated. However, by increasing the voltage change of the capacitors, the amount of time available for the computer system to complete those operations is increased accordingly.

Figure 1:
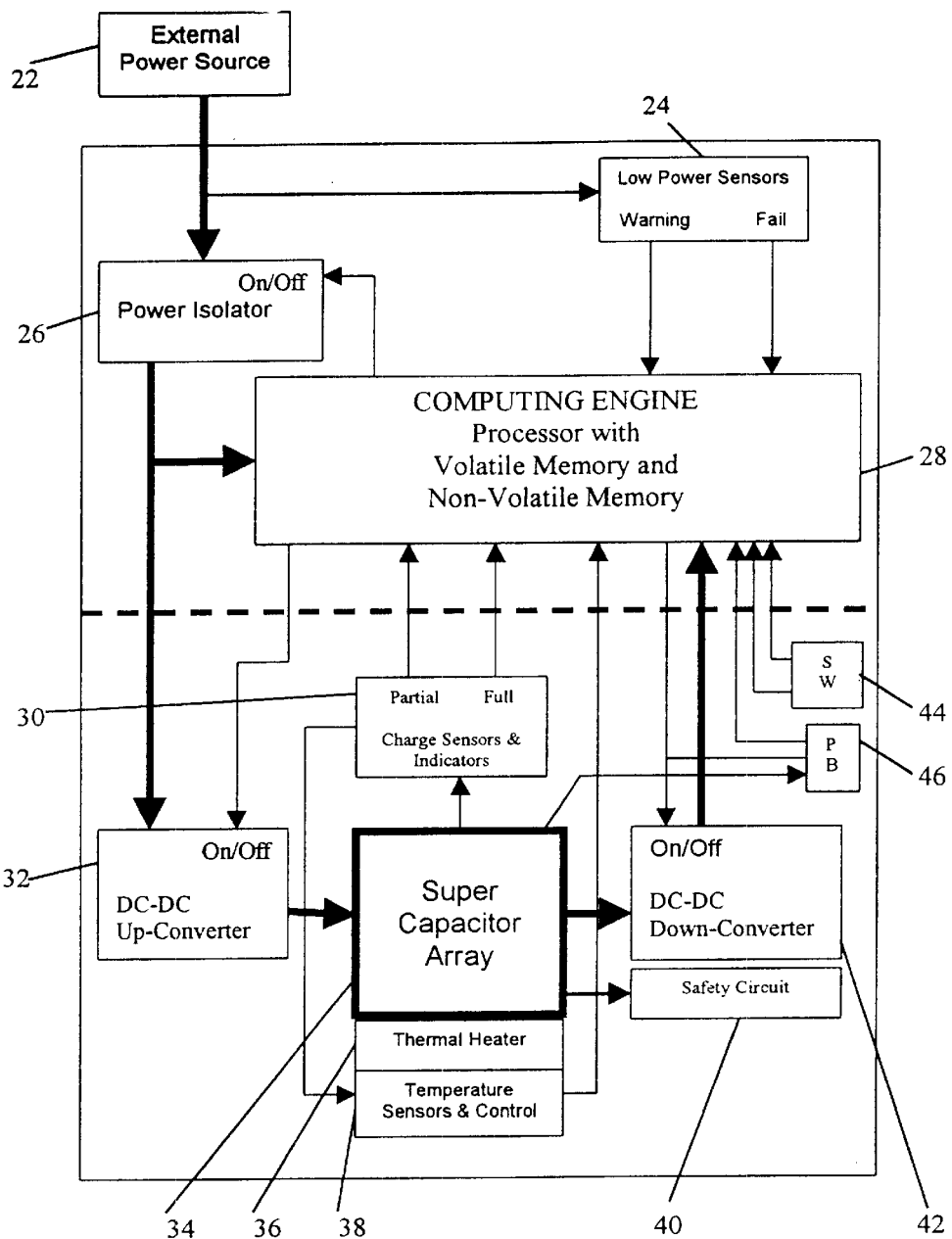
FIG. 1 shows a system in accordance with the present invention.

To more specifically understand the method and system of the present invention refer now to the following detailed description of a preferred embodiment of a system 20 in accordance with the present invention along with the accompanying FIG. 1. The computing engine CE 28 containing the processor, volatile and non-volatile memory, is supplied power from the external power source EPS 22 through the power isolator PI 26. The PI 26 isolates the CE 28 from the EPS 22. Power sensors 24 are implemented to notify the CE 26 of any sudden loss of power from the EPS 22.

An up-converter 32 is coupled to a plurality of super-capacitors SC 34 in order to convert the voltage supplied by the EPS 22 and charge the super-capacitors 34. Two charge level sensors 30 inform the CE 28 when the SC 34 are partially and fully charged. Once the SC 34 are fully charged, the demand for current is minimal and the charging circuit goes into trickle charge mode to keep the SC 34 at their peak charge value. A down converter DC 42 is also coupled to the SC 34 to convert the voltage from the SC 34 to supply power to the CE 28.

Preferably, the SC 34 chosen have an operating temperature range from −40° C. to +85° C. since many computer systems have an operating temperature range from −40° C. to +85° C. If the SC 34 chosen have a higher minimum operating temperature, temperature sensors and controls 38 are utilized to activate thermal heaters 36 once the temperature falls below 0° C. to keep the SC 34 from becoming too cold. The heaters 36 are powered by the SC 34, but once the SC 34 fall below full charge, the temperature control circuit 38 is overridden and the heaters 36 are turned off to preserve the power stored in the super-capacitors 34. Additionally, a signal from the temperature sensors and controls 38 is sent to CE 28 warning that the SC 34 are below their minimum operating temperature.

If the SC 34 and the associated circuitry 30, 32, 36, 38, 42 are configured as a removable option to the system 20 a safety circuit 40 is necessary to automatically and fully discharge the super-capacitors 34 into a load resistor when they are removed. This will prevent injury to the technician and also prevent damage to SC 34 and the associated circuitry 30, 32, 36, 38, 42.

Although this invention is described in the context of utilizing three voltage converters, one of ordinary skill in the art will readily recognize that a variety of voltages could be used in this system. Accordingly, the number of converters utilized could vary without departing from the spirit and scope of the present invention.

The method and system in accordance with the present invention is now disclosed in the context of a preferred embodiment. A first aspect of the preferred embodiment ensures that all data in the volatile memory are stored into the non-volatile memory without being lost or corrupted for all instances of power loss. A second aspect of the preferred embodiment of the method and system in accordance with the present invention allows a user to securely erase all the data in the non-volatile memory quickly and irretrievably either automatically or manually regardless of the availability of external power.

The method and system in accordance with the present invention preferably incorporates a three position manual switch 44, preferably located on the mechanical assembly containing the super capacitors and the associated circuitry, which allows the user to select 1 of 3 modes of operation, save mode, erase mode, and standby mode. Furthermore, a pushbutton 46 may be incorporated to permit the user to utilize the super-capacitor power source and command the CE 28 to erase all data from the non-volatile memory.

Although this invention is described in the context of utilizing a switch and pushbutton, one of ordinary skill in the art will readily recognize that a variety of methods to accomplish the same tasks could be used in this system. Accordingly, the switch and or pushbutton could be mounted externally from the system without departing from the spirit and scope of the present invention.

If the system is operating in save mode, the first aspect of the present invention is implemented wherein all data is automatically transferred from volatile memory to the non-volatile memory in the event of a sudden power loss from the external power source.

If the system is in erase mode, the second aspect of the present invention is implemented wherein all data is completely and irretrievably erased from the non-volatile memory in the event of a sudden power loss from the external power source.

In the save and erase modes, the super-capacitors will continue to discharge and power the computer system even after all the data has been transferred until the down-converter has insufficient voltage differential to continue proper operation and shuts down thus turning off the computer system. This will typically be only a few seconds.

Finally, if the system is in standby mode, the system will shut down when external power source is shut down, however the charge is maintained in the super-capacitors after the power is removed from the system. This mode incorporates a pushbutton which when depressed, will activate the super-capacitors to power up the system while simultaneously activating an erase command. This standby mode permits the system to be removed from the external power source and transported for an extended amount of time, while maintaining the ability to erase all the non-volatile memory if the pushbutton is depressed.

Although this invention is described in the context of the utilization of a manual switch and pushbutton, one of ordinary skill in the art will readily recognize that a variety of methods could be utilized while staying within the spirit and scope of the invention. For example, the concept of a manual pushbutton can easily be extended to a wireless pushbutton wherein a system fitted with the present invention containing a wireless receiver can be commanded to erase from a separate location.

Figure 2:
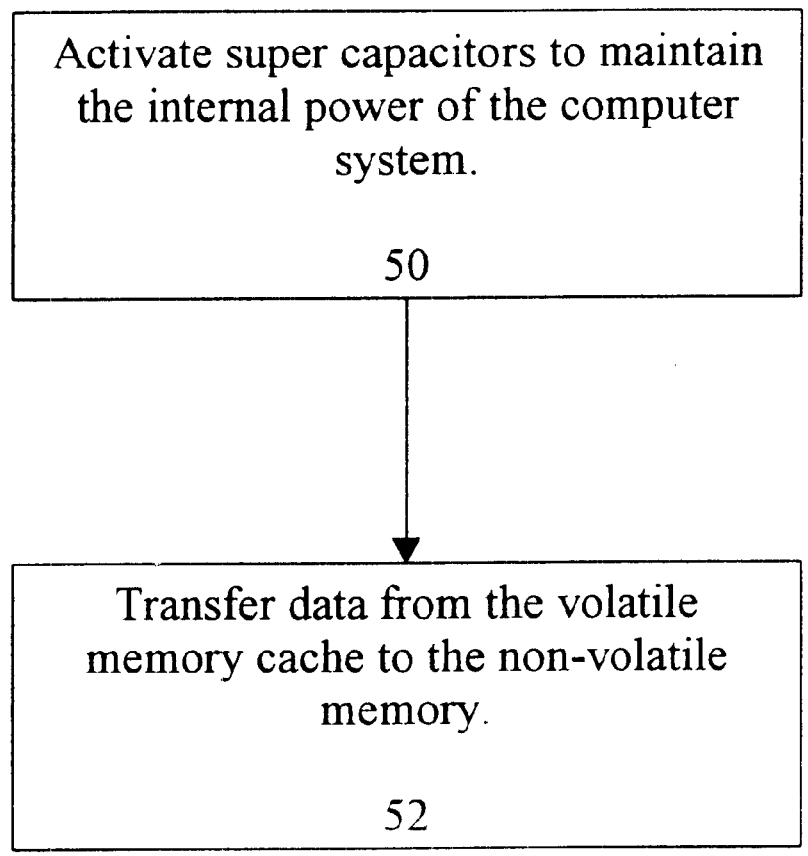
FIG. 2 is a high-level flowchart of the first aspect of the method in accordance with the present invention.

To more particularly describe the "save mode" feature of the method in accordance with the present invention, please refer to flowchart of FIG. 2. If a system is in "save mode" and is subsequently subjected to a sudden power loss, first, the super-capacitors are activated to maintain the internal power of the system, via step 50. Finally, data from the volatile memory is transferred to the non-volatile memory, via step 52. Through the use of the method in accordance with the present invention, a user is able to quickly and correctly transfer all data from volatile memory to non-volatile memory in the event of a sudden power loss.

Figure 3:
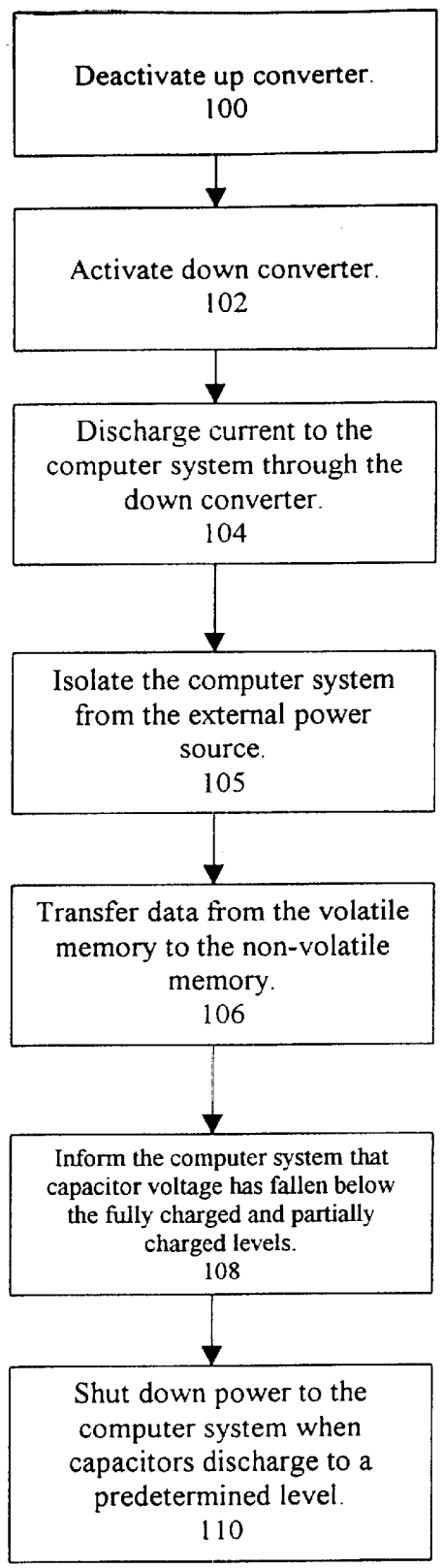
FIG. 3 is a flowchart of the operation of the first aspect of the method in accordance with the present invention.

To better understand the operation of the "save mode" feature of the method in accordance with the present invention, please refer to the flowchart of FIG. 3. First, once the computer system detects that the external system power has fallen below a certain threshold amount via the power sensors, the up-converter is deactivated, via step 100. Next, the down-converter is activated to maintain the internal power of the system, via step 102. This reverses the flow of current between the computer system and the super-capacitors. The super-capacitors then begin to slowly discharge current to the computer system through the down-converter, via step 104. Then the computer system is isolated from the external power source, via step 105. This prevents any contention between the external power source and the down-converter. The rate of discharge depends on the amount of capacitance and the amount of current needed by the computer system. While the computer system is receiving current from the super-capacitors, data is transferred from the volatile memory to the non-volatile memory, via step 106. Next, the two charge level sensors inform the computer system that the super-capacitor voltage has fallen below the fully charged and partially charged levels, via step 108. Finally, once the super-capacitors discharge to a predetermined level, the down-converter has insufficient voltage differential to continue proper operation and shuts down, thus turning off the power to the computer system, via step 110.

This has two positive side effects. First, if the output voltage from the down-converter were allowed to fall below the minimum operating voltage of the computer system, the computer system could continue to run with unpredictable and potentially serious results. Also, by not fully discharging the super-capacitors they will take only a few seconds to recharge once the external system power is restored, whereas the initial charge of super-capacitors may take up to 5 minutes. If, after all the data has been saved, the computer system detects the external power system is risen back to normal levels, the computer system is reconnected to the external power system, the super-capacitor down-converter is deactivated, and the up-converter is activated to recharge the super-capacitors. Accordingly, through the use of a system and method in accordance with the present invention, a user is able to accurately transfer all data from volatile storage to non-volatile memory in the event of a sudden power loss.

The "erase mode" of the method and system in accordance with the present invention is the second aspect of the present invention and is now described in the context of a preferred embodiment. The second aspect of the present invention focuses on a computer systems ability to securely erase all data even in event of a sudden power loss. The method and system in accordance with the present invention has the ability to irretrievably erase the entire contents of a large non-volatile memory hundreds of times faster than a conventional rotational hard disk drive. This is accomplished by erasing many non-volatile memory chips in parallel. Consequently, the speed at which an entire non-volatile memory can be erased is only limited by the available power to the non-volatile memory chips.

Figure 4:
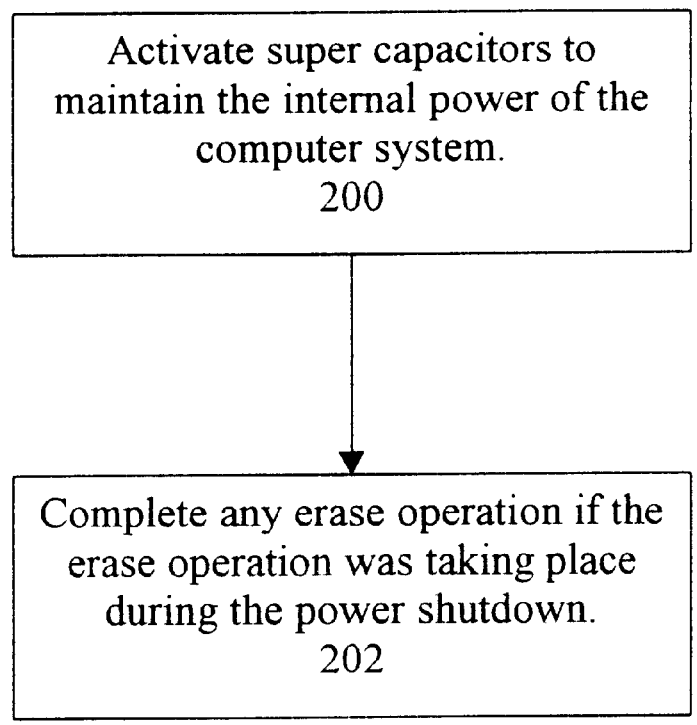
FIG. 4 is a high-level flowchart of the second aspect of the method in accordance with the present invention.

To more particularly describe the "erase mode" feature of the method in accordance with the present invention, please refer to flowchart of FIG. 4. If a system is in "erase mode" and is subsequently subjected to a sudden power loss, first, the super-capacitors are activated to maintain the internal power of the system, via step 200. Then an erase command is executed until completed, via step 202. Since the super-capacitors are preferably able to provide a significant amount of power to the computer system for a sufficient period of time, the method and system in accordance with the present invention has the ability to complete the entire erase operation in the event of a external system power loss.

Figure 5:
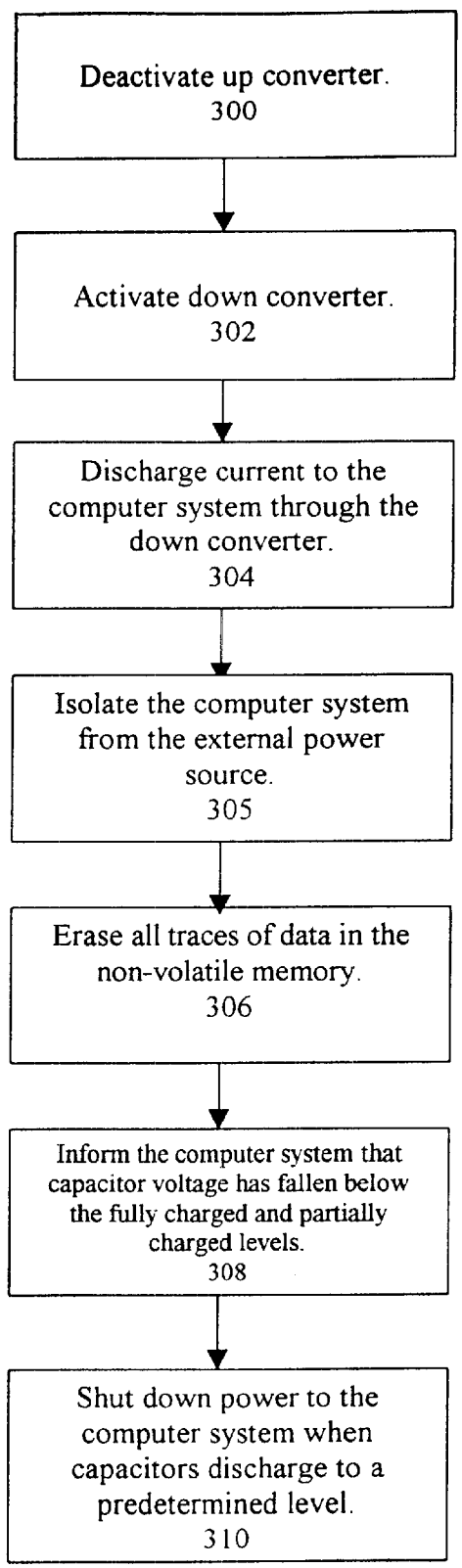
FIG. 5 is a flowchart of the operation of the first aspect of the method in accordance with the present invention.

To further understand the operation of the "erase mode" feature of the method in accordance with the present invention, please refer to the flowchart of FIG. 5. First, once the computer system detects that the external system power has fallen below a certain threshold amount, the up-converter is deactivated, via step 300. Next, the down-converter is activated to maintain the internal power of the system, via step 302. This reverses the flow of current between the volatile memory and the super-capacitors. The super-capacitors then begin to slowly discharge current to the computer system through the down-converter, via step 304. The computer system is then isolated from the external power source, via step 305. This prevents any contention between the external power source and the down-converter. The rate of discharge depends on the amount of capacitance and the amount of current needed by the computer system. While the computer system is receiving current from the super-capacitors, all traces of data in the volatile memory is completely erased, via step 306. Next, the two charge level sensors inform the computer system that the super-capacitor voltage has fallen below the fully charged and partially charged levels, via step 308. Finally, once the super-capacitors discharge to a predetermined level, the down-converter has insufficient voltage differential to continue proper operation and shuts down, thus turning off the power to the computer system, via step 310.

This has two positive side effects. First, if the output voltage from the down-converter were allowed to fall below the minimum operating voltage of the computer system, the computer system could continue to run with unpredictable and potentially serious results. Also, by not fully discharging the super-capacitors they will take only a few seconds to recharge once the external system power is restored, whereas the initial charge of super-capacitors may take up to 5 minutes.

A significant feature of the second aspect of the present invention is the "standby mode" which provides the ability to erase data manually while the system is removed from the system. This is preferably done with the incorporation of a pushbutton. Once the super-capacitors are fully charged, the system may be removed from external system power and the super-capacitors will retain a sufficient charge for all modes of operation preferably for up to 60 minutes. Thus, if a system containing sensitive data is being transported, the erase command can be activated by depressing the external pushbutton connected to the system, at which time the system will be powered up and the entire contents of the non-volatile memory will be rapidly and irretrievably erased.

Through the use of a system and method in accordance with the present invention, a user is able to accurately transfer all data from volatile memory to non-volatile memory in the event of a sudden external system power loss. Furthermore, the user of a system and method in accordance with the present invention will be able to rapidly and irretrievably erase all data from the non-volatile memory manually or automatically in the event of a sudden external system power loss. These features consume minimal space and are implemented in an affordable manner.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for controlling data in a computer system when the computer system loses power, the computer system comprising a computing engine, comprising the steps of:
    (a) activating a plurality of super capacitors to supply power to the computing engine based upon power being removed from the computer system;
    (b) reconfiguring the data in the computing engine; and
    (c) deactivating the plurality of super capacitors to cut off power to the computing engine based upon the plurality of super capacitors discharging to a predetermined level.

2. The method of claim 1 wherein the computing engine comprises a least one volatile memory and at least one non-volatile memory.

3. The method of claim 2 wherein the reconfiguring step (b) further comprises:
    (b1) allowing all data to be transferred from the at least one volatile memory to the at least one non-volatile memory.

4. The method of claim 2 wherein the reconfiguring step (b) further comprises:
    (b1) allowing all data in the at least one volatile memory to be erased.

5. The method of claim 4 wherein the reconfiguring step (b) further comprises:
    (b2) allowing all data in the at least one non-volatile memory to be erased.

6. The method of claim 3 wherein the activating step (a) further comprises:
    (a1) reversing the flow of current between the computing engine and the plurality of super capacitors; and
    (a2) discharging current from the plurality of super capacitors to the computing engine.

7. The method of claim 4 wherein the activating step (a) further comprises:
    (a1) reversing the flow of current between the computing engine and the plurality of super capacitors; and
    (a2) discharging current from the plurality of super capacitors to the computing engine.

8. The method of claim 5 wherein the allowing step (b2) is initiated based upon a user interaction.

9. The method of claim 8 wherein the user interaction is the depressing of a button.

10. A system for controlling data in a computer system when the computer system loses power, the computer system comprising a computer engine, comprising:
    means for activating a plurality of super capacitors to supply power to the computing engine based upon power being removed from the computer system;
    means for reconfiguring the data in the computing engine; and
    means for deactivating the plurality of super capacitors to cut off power to the computing engine based upon the plurality of super capacitors discharging to a predetermined level.

11. The system of claim 10 wherein the computing engine comprises a least one volatile memory and at least one non-volatile memory.

12. The system of claim 11 wherein the reconfiguring means further comprises:
    means for allowing all data to be transferred from the at least one volatile memory to the at least one non-volatile memory.

13. The system of claim 11 wherein the reconfiguring means further comprises:
    means for allowing all data in the at least one volatile memory to be erased.

14. The system of claim 13 wherein the allowing means further comprises:
    means for allowing all data in the at least one non-volatile memory to be erased.

15. The system of claim 12 wherein the activating means further comprises:
    means for reversing the flow of current between the computing engine and the plurality of super capacitors; and
    means for discharging current from the plurality of super capacitors to the computing engine.

16. The system of claim 13 wherein the activating means further comprises:
    means for reversing the flow of current between the computing engine and the plurality of super capacitors; and
    means for discharging current from the plurality of super capacitors to the computing engine.

17. The system of claim 14 wherein the allowing means is initiated based upon a user interaction.

18. The system of claim 17 wherein the user interaction is the depressing of a button.

19. A method for controlling data in a computer system when the computer system loses power, the computer system comprising a computing engine, comprising the steps of:
    (a) allowing the computer system to be placed in an erase mode;
    (b) activating a plurality of super capacitors to supply power to the computing engine based upon power being removed from the computer system; and
    (c) securely erasing data in the computing engine to prevent access to the data each time power is removed from the computing engine and the system is in the erase mode.

20. The method of claim 19 wherein the allowing step (a) further includes the step of:
    (a1) allowing the computer system to be placed in the erase mode or in a save mode.

21. The method of claim 20 further comprising the step of:
    (d) saving the data in the computing engine in a non-volatile storage in each time power is removed from the computing engine and the system is in the save mode.

22. A method for controlling data in a computer system when the computer system loses power, the computer system comprising a computing engine, comprising the steps of:

(a) activating a plurality of super capacitors to supply power to the computing engine based upon power being removed from the computer system;

(b) placing the computer system in a standby mode based upon power being removed from the computer system;

(c) providing power to the computer system using the plurality of super capacitors in response to a user interaction after the computer system has entered standby mode; and (d) erasing data in the computing engine based upon the user interaction.

23. A method for controlling data in a computer system when the computer system loses power, the computer system comprising a computing engine, comprising the steps of:

(a) activating a plurality of super capacitors to supply power to the computing engine based upon power being removed from the computer system;

(b) reconfiguring the data in the computing engine; and (c) ensuring that the plurality of super capacitors is maintained in a desired temperature range.

24. A system for controlling data in a computer system when the computer system loses power, the computer system comprising a computing engine, comprising:

means for activating a plurality of super capacitors to supply power to the computing engine based upon power being removed from the computer system; and means for reconfiguring the data in the computing engine, the reconfiguring means being capable of being placed in an erase mode;

wherein the reconfiguring means further securely erase data in the computing engine to prevent access to the data each time each time power is removed from the computing engine and the system is in the erase mode.

25. The system of claim 24 wherein the reconfiguring means can further be placed in the erase mode or in a save mode.

26. The system of claim 25 wherein the reconfiguring means further save the data in the computing engine in a non-volatile storage in each time power is removed from the computing engine and the system is in the save mode.

27. A system for controlling data in a computer system when the computer system loses power, the computer system comprising a computing engine, comprising:

means for activating a plurality of super capacitors to supply power to the computing engine based upon power being removed from the computer system, for placing the computer system in a standby mode based upon power being removed from the computer system, providing power to the computer system based upon a user interaction after the computer system has entered standby mode;

means for reconfiguring the data in the computing engine, the reconfiguring means further including means for erasing a portion of the data in the computing engine based upon the user interaction.

28. A system for controlling data in a computer system when the computer system loses power, the computer system comprising a computing engine, comprising:

means for activating a plurality of super capacitors to supply power to the computing engine based upon power being removed from the computer system;

means for reconfiguring the data in the computing engine; and means for ensuring that the plurality of super capacitors is maintained in a desired temperature range.

* * * * *